(12) United States Patent
Murayama

(10) Patent No.: US 7,559,412 B2
(45) Date of Patent: Jul. 14, 2009

(54) DISC BRAKE APPARATUS

(75) Inventor: Takashi Murayama, Kariya (JP)

(73) Assignee: Advics Co., Ltd., Kariya, Aichi-Pref. (JP)

(*) Notice: Subject to any disclaimer, the term of this patent is extended or adjusted under 35 U.S.C. 154(b) by 19 days.

(21) Appl. No.: 11/465,555

(22) Filed: Aug. 18, 2006

(65) Prior Publication Data

US 2007/0045061 A1 Mar. 1, 2007

(30) Foreign Application Priority Data

Sep. 1, 2005 (JP) .............................. 2005-253589

(51) Int. Cl.
*F16D 55/14* (2006.01)
(52) U.S. Cl. ....................................... 188/72.2
(58) Field of Classification Search .............. 188/72.8, 188/72.2, 72.7, 72.4, 73.31, 73.39
See application file for complete search history.

(56) References Cited

U.S. PATENT DOCUMENTS

| | | | |
|---|---|---|---|
| 3,537,759 A * | 11/1970 | DuBois | 303/112 |
| 5,379,868 A * | 1/1995 | Kurasako et al. | 188/72.2 |
| 5,758,928 A * | 6/1998 | Kobayashi et al. | 303/2 |
| 6,302,499 B1 * | 10/2001 | Linkner et al. | 303/119.2 |
| 7,070,248 B2 * | 7/2006 | Hara et al. | 303/155 |
| 7,143,873 B2 * | 12/2006 | Pascucci et al. | 188/72.7 |
| 2002/0140286 A1 * | 10/2002 | Ishimura et al. | 303/155 |

FOREIGN PATENT DOCUMENTS

| | | | |
|---|---|---|---|
| JP | 04231261 A | * | 8/1992 |
| JP | 07167172 A | * | 7/1995 |
| JP | 3000835 | | 11/1999 |
| WO | WO 03/091591 A1 | * | 11/2003 |

* cited by examiner

*Primary Examiner*—Robert A Siconolfi
*Assistant Examiner*—James K Hsiao
(74) *Attorney, Agent, or Firm*—Buchanan Ingersoll & Rooney PC

(57) ABSTRACT

In a disc brake apparatus, by means of an actuator which operates in accordance with an operation force, a braking piston fitted into a cylinder portion of a caliper is axially driven so as to push a pad toward a disc rotor. A friction force in a circumferential direction of the disc rotor between the pad and the disc rotor is taken out as an anchor load, and is converted to a servo load by means of a servomechanism. The servo load is applied to the braking piston. The servomechanism is equipped with a hydraulic mechanism (a pressure-reducing control valve, a pressure-increasing control valve, and a reservoir tank) capable of increasing or decreasing the servo load. An electric controller controls the hydraulic mechanism in accordance with the operation force and the anchor load.

3 Claims, 5 Drawing Sheets

DISC BRAKE APPARATUS

CROSS REFERENCE TO RELATED APPLICATION

This application is based on and claims under 35 U.S.C. sect. 119 with respect to Japanese Patent Application No. 2005-253589 filed on Sep. 1, 2005, the entire content of which is incorporated herein by reference.

BACKGROUND OF THE INVENTION

1. Field of the Invention

The present invention relates to a disc brake apparatus, and more particularly to a disc brake apparatus configured such that, by means of an actuator which operates in accordance with an operation force (e.g., brake-pedal stepping-on force), a braking piston which is fitted into a cylinder portion of a caliper in an axially slidable manner is axially driven so as to push a pad toward a disc rotor; a friction force in a circumferential direction of the disc rotor between the pad and the disc rotor is taken out as an anchor load (braking reaction-force); and a servomechanism converts the anchor load to a servo load, which is applied to the braking piston.

2. Description of the Related Art

A disc brake apparatus of this kind is disclosed in, for example, Japanese Patent No. 3000835. In this disc brake apparatus, an anchor load is taken out in the form of oil pressure, and the oil pressure is applied to a braking piston via a pressure-increasing control valve of a servomechanism.

The pressure-increasing control valve appearing in the above publication functions as a normally-open on-off valve. When the taken-out oil pressure becomes a predetermined number of times an operation force (i.e., master cylinder oil-pressure) or more, the pressure-increasing control valve shuts off an oil-pressure transmission path to the braking piston, thereby preventing application of the taken-out oil pressure to the braking piston. This prevents an increase of an oil pressure (servo oil-pressure) to be applied to the braking piston to a predetermined value or higher.

However, since the oil pressure (servo oil pressure) which is applied to the braking piston through the pressure-increasing control valve is merely an oil pressure converted from the anchor load, the following problem arises. When coefficient of friction between the pad and the disc rotor varies because of, for example, entry of water or thermal fading, the oil pressure varies with the coefficient of friction. Specifically, when coefficient of friction between the pad and the disc rotor decreases (increases) as compared with a predetermined value, the friction force between the pad and the disc rotor decreases (increases) as compared with a predetermined value, and thus the anchor load decreases (increases) as compared with a predetermined value. Accordingly, the servo oil-pressure decreases (increases) as compared with a predetermined value, and thus the servo load to be applied to the braking piston decreases (increases) as compared with a predetermined value. Thus, the braking force which the disc brake apparatus produces decreases (increases) as compared with a predetermined value. As a result, the disc brake apparatus fails to brake the disc rotor in a predetermined braking mode (a braking mode for the case where the coefficient of friction is the predetermined value). In the case of a vehicle, the vehicle fails to be braked within a predetermined braking distance.

SUMMARY OF THE INVENTION

An object of the present invention is to solve the above-mentioned problems in the conventional disc brake apparatus and to provide a disc brake apparatus which can brake a disc rotor in a predetermined braking mode even when coefficient of friction between a pad and the disc rotor varies.

To achieve the above object, the present invention provides a disc brake apparatus which comprises an actuator operating in accordance with an operation force; a braking piston fitted into a cylinder portion of a caliper to be axially slidable, the braking piston being axially driven by the actuator so as to push a pad toward a disc rotor; friction-force taking out means for taking out, as an anchor load, a friction force in a circumferential direction of the disc rotor between the pad and the disc rotor; a servomechanism for converting the anchor load to a servo load, which is applied to the braking piston; changing means provided in the servomechanism and adapted to increase or decrease the servo load; and control means for controlling operation of the changing means in accordance with the operation force and the anchor load so as to increase or decrease the servo load in accordance with the operation force and the anchor load.

The actuator may be a motor-driven actuator or a hydraulic actuator. Also, preferably, the anchor load and the servo load may be in the form of oil pressure, and the changing means may comprise an oil-pressure control valve and a reservoir tank.

According to the disc brake apparatus of the present invention, at the time of braking, an output of the actuator, which operates in accordance with an operation force, and a servo load which the servomechanism produces can be applied to the braking piston, which pushes the pad toward the disc rotor for braking the disc rotor. Thus, even though the output of the actuator is small, a large braking force can be produced, thereby allowing a reduction in the size (a reduction in output) of the actuator.

The changing means increases or decreases a servo load to be applied to the braking piston, in accordance with the operation force and the anchor load. For example, when the coefficient of friction between the pad and the disc rotor decreases (increases) as compared with a predetermined value because of entry of water or thermal fading, and thus the friction force between the pad and the disc rotor decreases (increases) as compared with a predetermined value, with a resultant decrease (increase) in the anchor load as compared with a predetermined value which is determined by the current operation force, the changing means can increase (decrease) the servo load as compared with the predetermined value.

By the above procedure, even though the coefficient of friction between the pad and the disc rotor decreases (increases) as compared with the predetermined value, the servo load to be applied to the braking piston increases (decreases) as compared with the predetermined value to thereby compensate the decrease (increase) in the coefficient of friction. Thus, the braking force which the disc brake apparatus produces assumes approximately a predetermined value (a value approximate to a predetermined braking force which is determined by the current operation force). Therefore, the disc rotor can be braked in a braking mode substantially similar to a predetermined braking mode (a braking mode for the case where the coefficient of friction is the predetermined value).

In the case of a vehicle, the vehicle can be braked within a braking distance approximately similar to a predetermined braking distance.

In the case where the servo load to be applied to the braking piston increases as compared with the predetermined value, an increase in the servo load is up until the braking force which the disc brake apparatus produces assumes approximately the predetermined value, thereby preventing an excessive increase in the servo load to be applied to the braking piston.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
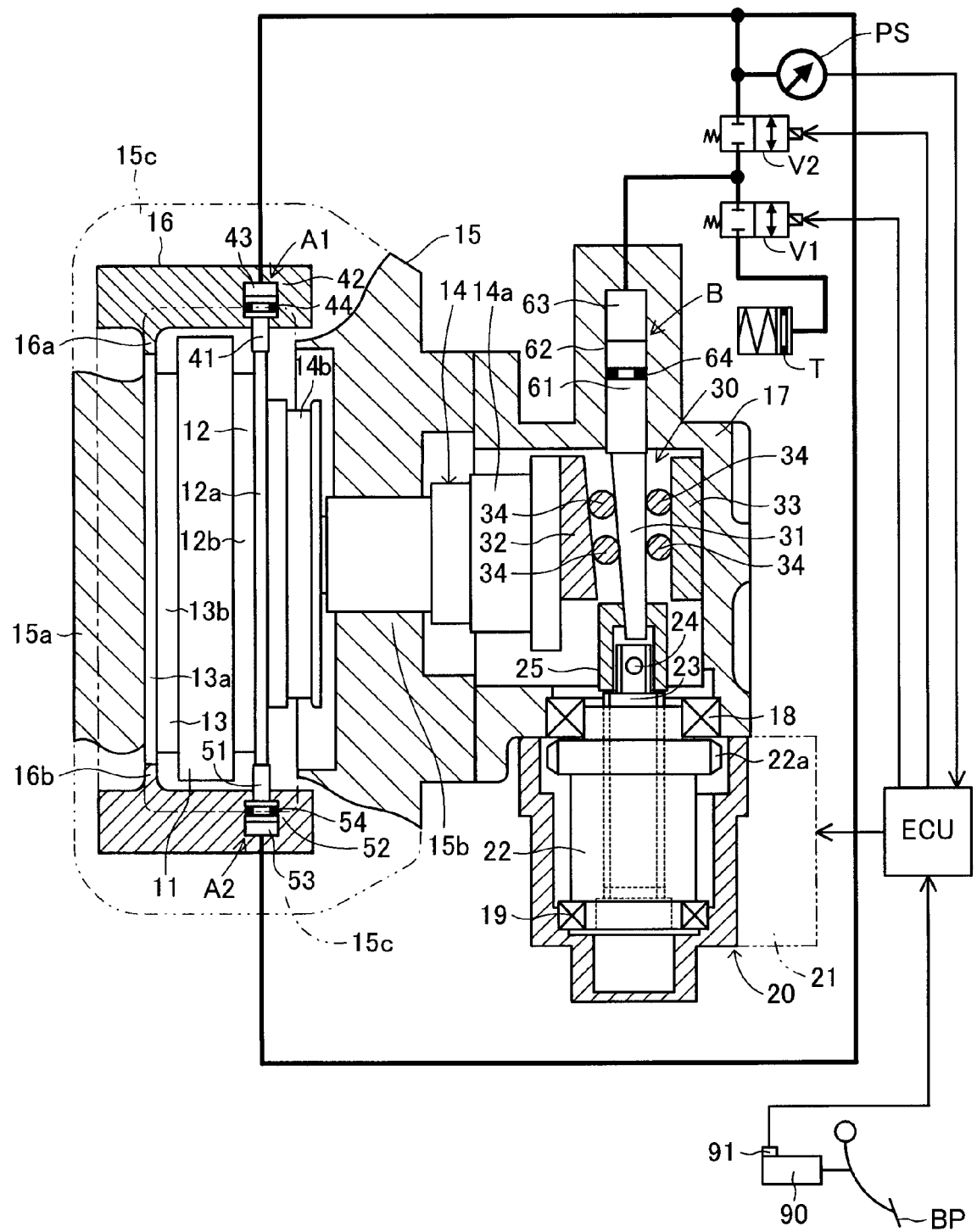
FIG. 1 is a view schematically showing a first embodiment of a disc brake apparatus according to the present invention.

Embodiments of the present invention will next be described in detail with reference to the drawings. FIG. 1 schematically shows a disc brake apparatus for a vehicle according to a first embodiment of the present invention. The disc brake apparatus of the first embodiment includes a pair consisting of an inner pad 12 and an outer pad 13 capable of holding therebetween a disc rotor 11 which unitarily rotates with a wheel (not shown); a braking piston 14 and a movable caliper 15 capable of pushing the inner and outer pads 12 and 13 toward respective braking surfaces of the disc rotor 11 along the axis of the disc rotor 11 (in a left-right direction in FIG. 1).

The braking piston 14 pushes the inner pad 12 toward the disc rotor 11 and presses it against the disc rotor 11 via a back metal 12a. A reaction-force arm portion 15a of the caliper 15 pushes the outer pad 13 toward the disc rotor 11 and presses it against the disc rotor 11 via a back metal 13a. The inner and outer pads 12 and 13 are attached, in a manner movable along the axis of the disc rotor 11, to a mounting 16, which is attached to a vehicle body (not shown). A braking torque associated with braking is received by receiver portions 16a and 16b and a pair of single-acting hydraulic cylinders A1 and A2 provided on the mounting 16.

The braking piston 14 includes a first braking piston 14a which is assembled to a cylinder portion 15b of the caliper 15 in a manner slidable along and rotatable about a cylinder axis, and a second braking piston 14b which is screw-engaged with the first braking piston 14a coaxially and in a manner capable of advancing and retreating and is unitarily (nonrotatably) fixed to the back metal 12a of the inner pad 12. The axial length of the braking piston 14 (the amount of screw engagement between the first braking piston 14a and the second braking piston 14b) is automatically adjusted in accordance with wear of linings 12b and 13b of the inner and outer pads 12 and 13.

The caliper 15 includes the reaction-force arm portion 15a, the cylinder portion 15b, and two connection arm portions 15c for connecting the reaction-force arm portion 15a and the cylinder portion 15b. The caliper 15 is attached, at the connection arm portions 15c, to the mounting 16 in a manner movable along the axis of the disc rotor 11 by a known method. A housing 17 to which a motor-driven actuator 20 and a wedge transmission mechanism 30 are attached is unitarily attached to the caliper 15.

The motor-driven actuator 20 includes an electric motor 21; a gear transmission mechanism for transmitting rotary drive force of the electric motor 21 to a nut 22 while reducing speed (the gear transmission mechanism includes a gear 22a formed integrally with the nut 22); and a screw feed mechanism for converting the rotary drive force of the nut 22 to axial drive force of a screw shaft 23 and transmitting the axial drive force to a wedge member 31 of the wedge transmission mechanism 30 via a connection pin 24 and a connection sleeve 25.

An electric control unit ECU controls the operation of the electric motor 21. The electric motor 21 is attached to the housing 17; is rotationally driven in the regular direction in response to a braking operation detected by a pedal simulator mechanism 90; and is rotationally driven in the reverse direction in response to a brake-releasing operation. The pedal simulator mechanism 90 produces a reaction force in accordance with an operation force (stepping-on force) applied to a brake pedal BP and includes a sensor 91 for detecting the operation force.

The nut 22 is attached to the housing 17 via a pair of bearings 18 and 19 rotatably and axially immovably. The screw shaft 23 is engaged with the nut 22 and is axially movable as the nut 22 is rotated. The connection pin 24 connects the screw shaft 23 and the connection sleeve 25. The connection sleeve 25 is connected to one end portion of the wedge member 31 by means of an unillustrated pin and can tilt about the connection pin 24 in relation to the screw shaft 23.

The wedge transmission mechanism 30 converts an axial drive force of the screw shaft 23 (a linear brake actuation input generated by actuation of the motor-driven actuator 20) to an axial drive force of the braking piston 14 (a brake actuation output) and transmits the axial drive force to the braking piston 14. The wedge transmission mechanism 30 includes the wedge member 31, which moves unitarily with the screw shaft 23 in the axial direction of the screw shaft 23; a piston-side plate 32 disposed on a side of the wedge member 31 toward the braking piston 14 and attached to an end portion of the braking piston 14; a counter-piston-side plate 33 disposed on a side of the wedge member 31 opposite the braking piston 14, attached unitarily to the housing 17, and disposed in opposition to the piston-side plate 32; and two pairs of rollers 34 (four rollers 34) which are disposed, together with the wedge member 31, between the piston-side plate 32 and the counter-piston-side plate 33 such that the rollers 34 can roll between the wedge member 31 and the respective plates 32 and 33.

The wedge member 31 has a piston-side wedge surface which is inclined in relation to the axis of the screw shaft 23, and a counter-piston-side wedge surface which is approximately parallel with the axis of the screw shaft 23. The rollers 34 are in rollable contact with the piston-side and counter-piston-side wedge surfaces. The piston-side plate 32 is attached to an end portion of the first braking piston 14a of the braking piston 14 in such a manner as to be movable unitarily with the braking piston 14 along and rotatable about the axial direction of the braking piston 14. The piston-side plate 32 has an engagement slant surface in parallel with the piston-side wedge surface (inclined surface) of the wedge member 31. The piston-side rollers 34 are in rollable contact with the engagement slant surface of the piston-side plate 32.

The counter-piston-side plate 33 has an engagement surface in parallel with the counter-piston-side wedge surface (uninclined surface) of the wedge member 31. The counter-piston-side rollers 34 are in rollable contact with the engagement surface of the counter-piston-side plate 33. The engagement surface of the counter-piston-side plate 33 is approximately parallel with the axis of the screw shaft 23. The moving direction of the wedge member 31 and the moving direction of the screw shaft 23 approximately coincide with each other.

The first embodiment employs a pair of single-acting hydraulic cylinders A1 and A2 as an anchor mechanism for taking out, as an anchor load, a friction force in the circumferential direction of the disc rotor 11 between the inner pad 12 and the disc rotor 11 at the time of braking. The first embodiment also employs a single-acting hydraulic cylinder B as a servomechanism for converting the anchor load which is taken out by the anchor mechanism, to a servo load and transmitting the servo load to the wedge member 31 of the wedge transmission mechanism 30 (a servomechanism for assisting brake actuation output). In this manner, the anchor load and the servo load are converted to respective oil pressures. A changing means capable of increasing or decreasing the servo load is attached to the single-acting hydraulic cylinder B, which serves as a servomechanism. The changing means includes a reservoir tank T, a pressure-reducing solenoid valve V1, and a pressure-increasing solenoid valve V2. The reservoir tank T has a piston and a return spring.

The single-acting hydraulic cylinder A1 takes out the anchor load as an anchor oil pressure at the time of braking during forward movement; is provided on one side of the back metal 12a of the inner pad 12 with respect to the circumferential direction of the disc rotor 11; and includes an anchor piston 41 and an anchor cylinder 42. The anchor piston 41 is assembled to the anchor cylinder 42, thereby forming an oil chamber 43 in the anchor cylinder 42. At the time of braking during forward movement, the back metal 12a of the inner pad 12 pushes the anchor piston 41 toward the one side of the back metal 12a with respect to the circumferential direction of the disc rotor 11. A seal member 44 attached to the anchor piston 41 isolates the interface between the anchor piston 41 and the anchor cylinder 42 from the atmosphere.

The anchor cylinder 42 is provided integrally with the mounting 16. When the back metal 12a of the inner pad 12 pushes the anchor piston 41 toward the one side of the back metal 12a with respect to the circumferential direction of the disc rotor 11, an oil pressure is built up in the oil chamber 43 in accordance with the anchor load. The anchor cylinder 42 may be provided integrally with the caliper 15.

The single-acting hydraulic cylinder A2 takes out the anchor load as an anchor oil pressure at the time of braking during reverse movement; is provided on the other side of the back metal 12a of the inner pad 12 with respect to the circumferential direction of the disc rotor 11; and includes an anchor piston 51 and an anchor cylinder 52. The anchor piston 51 is assembled to the anchor cylinder 52, thereby forming an oil chamber 53 in the anchor cylinder 52. At the time of braking during reverse movement, the back metal 12a of the inner pad 12 pushes the anchor piston 51 toward the other side of the back metal 12a with respect to the circumferential direction of the disc rotor 11. A seal member 54 attached to the anchor piston 51 isolates the interface between the anchor piston 51 and the anchor cylinder 52 from the atmosphere.

The anchor cylinder 52 is provided integrally with the mounting 16. When the back metal 12a of the inner pad 12 pushes the anchor piston 51 toward the other side of the back metal 12a with respect to the circumferential direction of the disc rotor 11, an oil pressure is built up in the oil chamber 53 in accordance with the anchor load. The anchor cylinder 52 may be provided integrally with the caliper 15.

The single-acting hydraulic cylinder B includes a servo piston 61 and a servo cylinder 62. The servo piston 61 is assembled to the servo cylinder 62, thereby forming an oil chamber 63 in the servo cylinder 62. An oil pressure in the oil chamber 63 pushes the servo piston 61, thereby pushing the wedge member 31 of the wedge transmission mechanism 30. A seal member 64 attached to the servo piston 61 isolates the interface between the servo piston 61 and the servo cylinder 62 from the atmosphere.

The servo cylinder 62 is provided integrally with the housing 17. The oil chamber 63 is connected to the reservoir tank T via the pressure-reducing solenoid valve V1 and is connected to the oil chambers 43 and 53 of the single-acting hydraulic cylinders A1 and A2 via the pressure-increasing solenoid valve V2. A servo oil pressure which is controlled by operation of the pressure-reducing solenoid valve V1 and the pressure-increasing solenoid valve V2 is applied to the oil chamber 63.

The pressure-reducing solenoid valve V1 is an oil pressure control valve which can establish or shut off communication between the oil chamber 63 and the reservoir tank T under the control of the electric control unit ECU. At the time of braking, the pressure-reducing solenoid valve V1 can reduce the servo oil pressure to be applied to the oil chamber 63. The pressure-increasing solenoid valve V2 is an oil pressure control valve which can establish or shut off communication between the oil chamber 63 and the oil chambers 43 and 53 under the control of the electric control unit ECU. The pressure-reducing solenoid valve V1 and the pressure-increasing solenoid valve V2 can establish communication for a predetermined time at the time of release of braking, whereby hydraulic oil in the reservoir tank T can be returned to the oil chambers 43, 53, and 63 for restoration to an initial state.

The electric control unit ECU controls the operation of the electric motor 21 in accordance with the operation force detected by the sensor 91 of the pedal simulator mechanism 90 such that a linear brake actuation input generated by actuation of the motor-driven actuator 20 is determined by the operation force. The electric control unit ECU controls the operation of the pressure-reducing and pressure-increasing solenoid valves V1 and V2 in accordance with the operation force detected by the sensor 91 of the pedal simulator mechanism 90 and an oil pressure (anchor oil pressure) detected by the pressure sensor PS provided in an oil path between the pressure-increasing solenoid valve V2 and the oil chambers 43 and 53 so as to control the servo oil pressure to be applied to the oil chamber 63 of the single-acting hydraulic cylinder B such that the anchor oil pressure (braking reaction-force) which is built up in the oil chamber 43 or 53 of the single-acting hydraulic cylinder A1 or A2 is determined by the operation force.

Specifically, when the anchor oil pressure which is built up in the oil chamber 43 or 53 of the single-acting hydraulic cylinder A1 or A2 is lower than a set value which is determined by the operation force (the set value increases or decreases depending on the operation force and is calculated on the basis of the operation force by the electric control unit ECU), the electric control unit ECU controls the operation of the pressure-reducing and pressure-increasing solenoid valves V1 and V2 so as to increase the servo oil pressure to be applied to the oil chamber 63 of the single-acting hydraulic cylinder B for bringing the anchor oil pressure close to the set value. When the anchor oil pressure is higher than the set value which is determined by the operation force, the electric control unit ECU controls the operation of the pressure-reducing and pressure-increasing solenoid valves V1 and V2 so as to decrease the servo oil pressure to be applied to the oil chamber 63 of the single-acting hydraulic cylinder B for bringing the anchor oil pressure close to the set value.

In the thus-configured disc brake apparatus of the first embodiment, when the brake pedal BP is stepped on, the electric motor 21 is rotationally driven in the regular direction (braking direction). A rotational drive force of the electric motor 21 is converted to an axial drive force (a drive force directed downward in FIG. 1) of the screw shaft 23 via the nut 22. The wedge transmission mechanism 30 converts the axial drive force of the screw shaft 23 to an axial drive force (a drive force directed leftward in FIG. 1) of the braking piston 14 and transmits the axial drive force to the braking piston 14.

By the above process, the braking piston 14 is axially driven and pushes the inner pad 12 toward the disc rotor 11 and presses it against the disc rotor 11, and an associated reaction force causes the reaction-force arm portion 15a of the caliper 15 to push the outer pad 13 toward the disc rotor 11 and press it against the disc rotor 11, whereby the inner pad 12 and the outer pad 13 holds the disc rotor 11 therebetween. This produces a braking force between the disc rotor 11 and each of the inner and outer pads 12 and 13 (a friction force in the circumferential direction of the disc rotor 11 between the disc rotor 11 and each of the linings 12b and 13b of the inner and outer pads 12 and 13), thereby braking the disc rotor 11.

In the disc brake apparatus of the first embodiment, when the brake pedal BP is released, supply of electricity to the electric motor 21 is shut off, and rigidity of the caliper 15 and unillustrated return springs return the braking piston 14, the wedge member 31, the screw shaft 23, and the like to their respective initial positions (positions before braking is effected). Thus, the brake actuation input and the brake actuation output cease. The braking piston 14 ceases pushing the inner pad 12 toward the disc rotor 11 and pressing it against the disc rotor 11, and the reaction-force arm portion 15a of the caliper 15 ceases pushing the outer pad 13 toward the disc rotor 11 and pressing it against the disc rotor 11. By this procedure, the inner and outer pads 12 and 13 release the disc rotor 11 from a braked condition. At this time, the electric control unit ECU controls the pressure-reducing solenoid valve V1 and the pressure-increasing solenoid valve V2 such that the pressure-reducing and pressure-increasing solenoid valves V1 and V2 allow communication therethrough, whereby hydraulic oil in the oil chambers 43, 53, and 63 and hydraulic oil in the reservoir tank T return to an initial condition (a condition before braking is effected).

The disc brake apparatus of the first embodiment employs the single-acting hydraulic cylinders A1 and A2 as an anchor mechanism for taking out, as an anchor load (anchor oil pressure), a friction force in the circumferential direction of the disc rotor 11 between the disc rotor 11 and the lining 12b of the inner pad 12 at the time of braking. The disc brake apparatus also employs the single-acting hydraulic cylinder B as a servomechanism for converting the anchor load (anchor oil pressure) to a servo load (servo oil pressure) and transmitting the servo load to the wedge member 31 of the wedge transmission mechanism 30.

Thus, for example, at the time of braking during forward movement, the anchor load pushes the anchor piston 41 of the single-acting hydraulic cylinder A1 to thereby build up oil pressure in the oil chamber 43. The oil pressure in the oil chamber 43 is transmitted, through an oil path, to the oil chamber 53 of the single-acting hydraulic cylinder A2 and attempts to move the anchor piston 51 on which no anchor load is exerted. However, at this time, the anchor piston 51 is in contact with the bottom of the anchor cylinder 52 and is thus immovable. Accordingly, the oil pressure which is built up in the oil chamber 43 of the single-acting hydraulic cylinder A1 can be transmitted to the oil chamber 63 of the single-acting hydraulic cylinder B through the pressure-increasing solenoid valve V2, thus pushing only the servo piston 61.

In the disc brake apparatus of the first embodiment, at the time of braking, an output of the motor-driven actuator 20, which operates in accordance with the operation force, and the servo load which the servomechanism produces can be applied to the braking piston 14, which pushes the inner pad 12 toward the disc rotor 11 for braking the disc rotor 11. Thus, even though the output of the motor-driven actuator 20 is small, a large braking force can be produced, thereby allowing a reduction in the size (a reduction in output) of the motor-driven actuator 20.

The changing means, which includes the reservoir tank T, the pressure-reducing solenoid valve V1, and the pressure-increasing solenoid valve V2, increases or decreases the servo load to be applied to the braking piston 14, in accordance with the operation force and the anchor load. For example, when the coefficient of friction between the inner pad 12 and the disc rotor 11 decreases (increases) as compared with a predetermined value because of entry of water or thermal fading, and thus the friction force between the inner pad 12 and the disc rotor 11 decreases (increases) as compared with a predetermined value, with a resultant decrease (increase) in the anchor load as compared with a predetermined value which is determined by the current operation force, the changing means can increase (decrease) the servo load as compared with a predetermined value.

By the above procedure, even though the coefficient of friction between the inner pad 12 and the disc rotor 11 decreases (increases) as compared with the predetermined value, the servo load to be applied to the braking piston 14 increases (decreases) as compared with the predetermined value to thereby compensate the decrease (increase) in the coefficient of friction. Thus, the braking force which the disc brake apparatus produces assumes approximately a predetermined value (a value approximate to the predetermined braking force which is determined by the current operation force). Therefore, the disc rotor 11 can be braked in a braking mode substantially similar to a predetermined braking mode (a braking mode for the case where the coefficient of friction is the predetermined value). The vehicle can be braked within a braking distance approximately similar to a predetermined braking distance.

In the case where the servo load to be applied to the braking piston 14 increases as compared with the predetermined value, the servomechanism of the disc brake apparatus is operated so as to control the increase in servo load. In this case, the electric control unit ECU controls the operation of the pressure-reducing and pressure-increasing solenoid valves V1 and V2 such that the oil pressure (anchor oil pressure) detected by the pressure sensor PS does not exceed a target anchor oil pressure (set value) which the electric control unit ECU calculates on the basis of the operation force detected by the sensor 91 of the pedal simulator mechanism

90, thereby preventing an excessive increase in the servo load to be applied to the braking piston 14.

The disc brake apparatus of the first embodiment allows easy connection, by means of oil paths, between the oil chamber 63 of the single-acting hydraulic cylinder B and the oil chambers 43 and 53 of the single-acting hydraulic cylinders A1 and A2; i.e., between the servo cylinder 62 and the anchor cylinders 42 and 52. Thus, regardless of arrangement of the wedge transmission mechanism 30 in relation to the inner pad 12, the single-acting hydraulic cylinders A1 and A2 and the single-acting hydraulic cylinder B can be arranged appropriately.

In the case where the disc brake apparatus of the first embodiment involves ABS control, ABS control has priority over the above-described control. When braking force is to be reduced by actuation of ABS, the electric control unit ECU shuts off supply of electricity to the electric motor 21 (alternatively, the ECU applies inverse current to the electric motor 21) and lowers the oil pressure to be applied to the servomechanism. When the braking force is to be increased by actuation of ABS, the electric control unit ECU increases the oil pressure to be applied to the servomechanism. Also, in this case, the electric control unit ECU controls the operation of the pressure-reducing and pressure-increasing solenoid valves V1 and V2 such that the oil pressure (anchor oil pressure) detected by the pressure sensor PS does not exceed the target anchor oil pressure (set value) which the electric control unit ECU calculates on the basis of the operation force detected by the sensor 91 of the pedal simulator mechanism 90.

The disc brake apparatus of the first embodiment can be set such that when brake control without a brake pedal being stepped on (e.g., traction control) is performed, for a relevant wheel(s), the braking force which the disc brake apparatus actually produces (a braking force which is produced as a result of the electric control unit ECU controlling the operation of the electric motor 21 in accordance with a preset program) is controlled on the basis of the oil pressure detected by the pressure sensor PS (actual anchor oil pressure), while being compared with a target braking force which the electric control unit ECU calculates.

Figure 2:
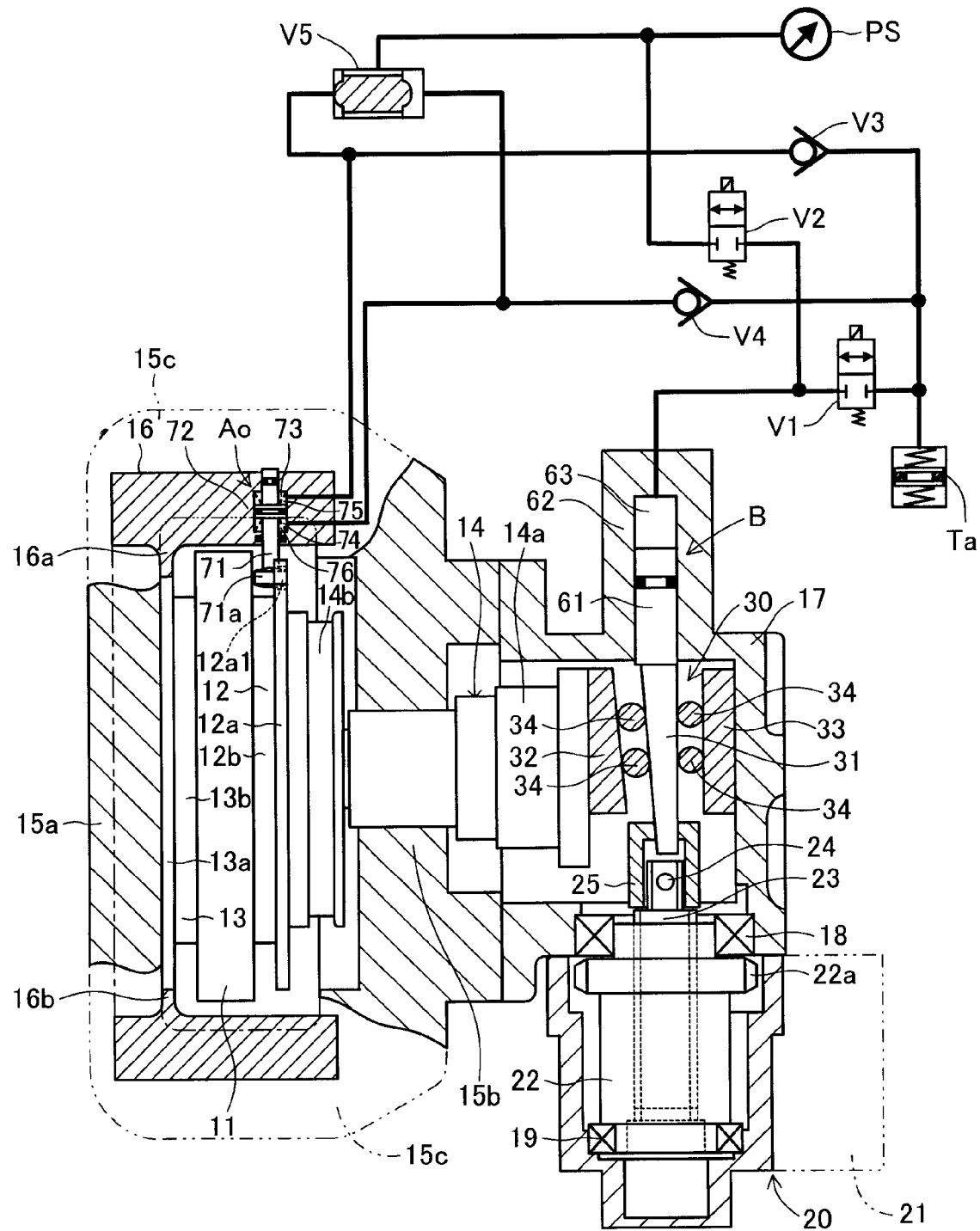
FIG. 2 is a view schematically showing a second embodiment of the disc brake apparatus according to the present invention.
Figure 3:
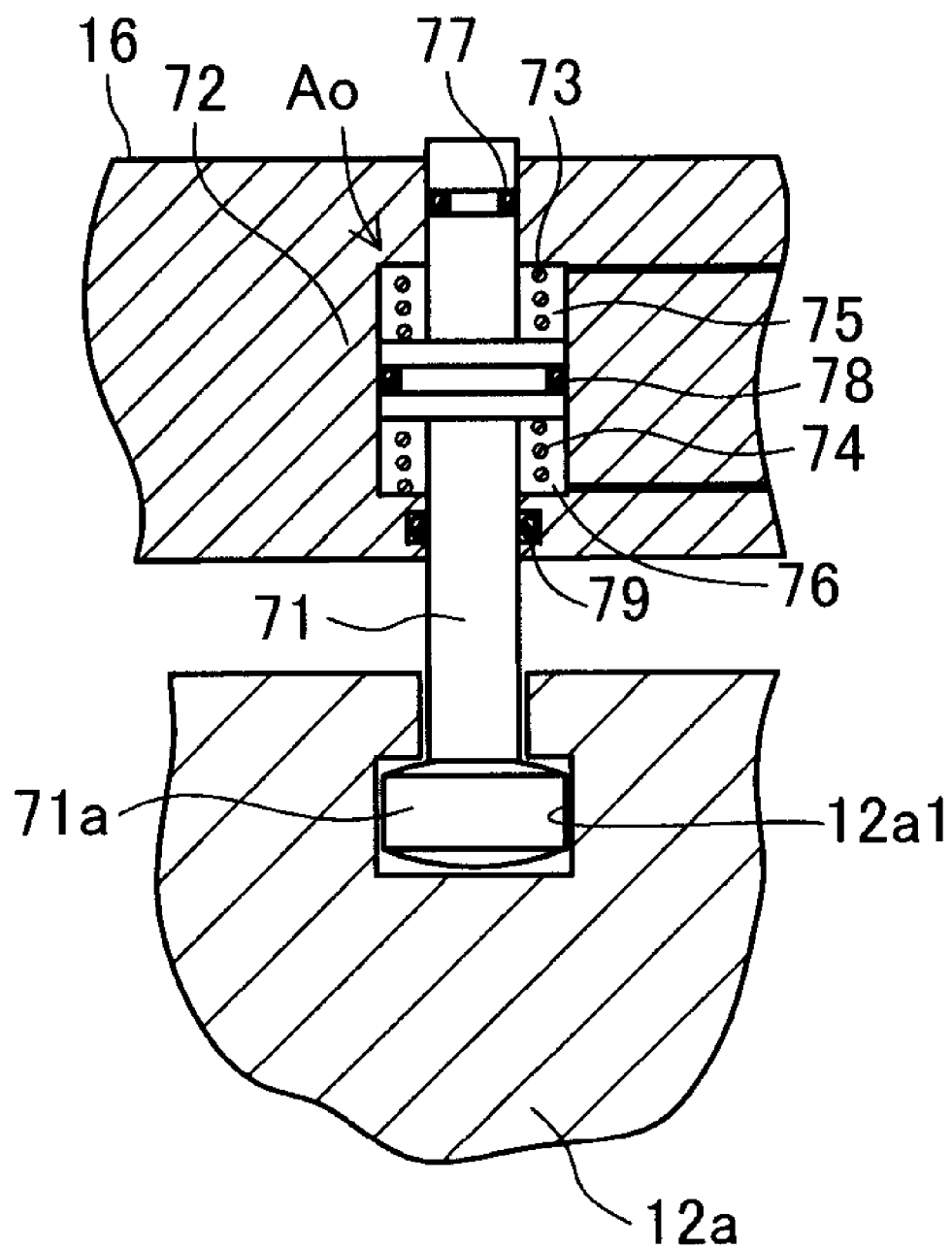
FIG. 3 is an enlarged view showing the relationship between an anchor piston and a back metal of an inner pad shown in FIG. 2.

The first embodiment is described while mentioning a pair of single-acting hydraulic cylinders A1 and A2 as an anchor mechanism. However, as shown in FIGS. 2 and 3, which shows a second embodiment of the present invention, the present invention can be embodied while employing a single double-acting hydraulic cylinder Ao as an anchor mechanism. In the second embodiment, a changing means capable of increasing or decreasing the servo load is attached to the single-acting hydraulic cylinder B, which serves as a servomechanism. The changing means includes a reservoir tank Ta, the pressure-reducing solenoid valve V1, and the pressure-increasing solenoid valve V2. The changing means further include a pair of check valves V3 and V4 and a changeover valve V5 for changing over oil paths between braking during forward movement and braking during reverse movement.

The double-acting hydraulic cylinder Ao shown in FIGS. 2 and 3 is provided on one side of the back metal 12*a* of the inner pad 12 with respect to the circumferential direction of the disc rotor 11 and includes an anchor piston 71 and an anchor cylinder 72, as well as a pair of springs 73 and 74.

The anchor piston 71 is assembled to the anchor cylinder 72 and is attached, at one end portion 71*a*, to an engagement groove 12*a*1 formed in the back metal 12*a* of the inner pad 12, in a manner movable along the axis of the disc rotor 11 and movable unitarily with the back metal 12*a* in the circumferential direction of the disc rotor 11. The anchor piston 71 and the anchor cylinder 72 define a pair of oil chambers 75 and 76. At the time of braking during forward movement or reversing, the back metal 12*a* of the inner pad 12 pushes the anchor piston 71 in the circumferential direction of the disc rotor 11. A portion of the one end portion 71*a* of the anchor piston 71 which abuts the back metal 12*a* of the inner pad 12 assumes a spherical shape (circular arc shape) so as to accurately transmit the anchor load from the back metal 12*a* of the inner pad 12 to the anchor piston 71 even when the inner pad 12 is inclined. The anchor piston 71 has a seal member 77 attached thereto for providing a seal between the atmosphere and the oil chamber 75, as well as a seal member 78 attached thereto for providing a seal between the oil chamber 75 and the oil chamber 76.

The anchor cylinder 72 is provided integrally with the mounting 16. When the back metal 12*a* of the inner pad 12 pushes the anchor piston 71 against a spring force of the spring 73 or 74 in the circumferential direction of the disc rotor 11, a pressure is built up in the oil chamber 75 or 76 in accordance with the anchor load. A seal member 79 is attached to the anchor piston 71 for providing a seal between the atmosphere and the oil chamber 76. The springs 73 and 74 are accommodated in the oil chambers 75 and 76, respectively, and apply respective forces to the anchor piston 71 toward a neutral position (initial position). Notably, the anchor cylinder 72 can be provided integrally with the caliper 15.

The oil chambers 75 and 76 are connected to the oil chamber 63 of the single-acting hydraulic cylinder B via the changeover valve V5 and the pressure-increasing valve V2 and are connected to the reservoir tank Ta via the check valves V3 and V4, respectively. The reservoir tank Ta includes a piston provided therein and a pair of springs for applying respective forces to the piston toward an neutral position. A seal member is attached to the piston for providing a seal between the atmosphere and an oil reservoir.

The check valves V3 and V4, the changeover valve V5, and the reservoir tank Ta function as follows. In the case where a positive pressure is built up in the oil chamber 75, while a negative pressure is built up in the oil chamber 76, a differential pressure moves the valve body of the changeover valve V5 such that communication is established between the oil chamber 75 and the pressure-increasing solenoid valve V2 and is shut off between the oil chamber 76 and the pressure-increasing solenoid valve V2. Thus, the pressure of the oil chamber 75 is transmitted to the oil chamber 63 of the single-acting hydraulic cylinder B via the pressure-increasing solenoid valve V2, and hydraulic oil is supplied to the oil chamber 76 from the oil reservoir of the reservoir tank Ta via the check valve V4. In the case where a positive pressure is built up in the oil chamber 76, while a negative pressure is built up in the oil chamber 75, a differential pressure moves the valve body of the changeover valve V5 such that communication is shut off between the oil chamber 75 and the pressure-increasing solenoid valve V2 and is established between the oil chamber 76 and the pressure-increasing solenoid valve V2. Thus, the pressure of the oil chamber 76 is transmitted to the oil chamber 63 of the single-acting hydraulic cylinder B via the pressure-increasing solenoid valve V2, and hydraulic oil is supplied to the oil chamber 75 from the oil reservoir of the reservoir tank Ta via the check valve V3.

The disc brake apparatus of the second embodiment employs the single double-acting hydraulic cylinder Ao as an anchor mechanism, and the double-acting hydraulic cylinder Ao is provided on one side of the back metal 12*a* of the inner pad 12 with respect to the circumferential direction of the disc rotor 11. In other word, only a single hydraulic cylinder is disposed at an end portion of the back metal 12a of the inner pad 12 with respect to the circumferential direction of the disc rotor 11, thereby simplifying the anchor mechanism. The disc brake apparatus of the second embodiment is configured similarly to the above-described first embodiment except that the double-acting hydraulic cylinder Ao, the check valves V3 and V4, the changeover valve V5, and the reservoir tank Ta are provided. Thus, at the time of braking and at the time of release of braking, the second embodiment operates similarly to the first embodiment.

Figure 4:
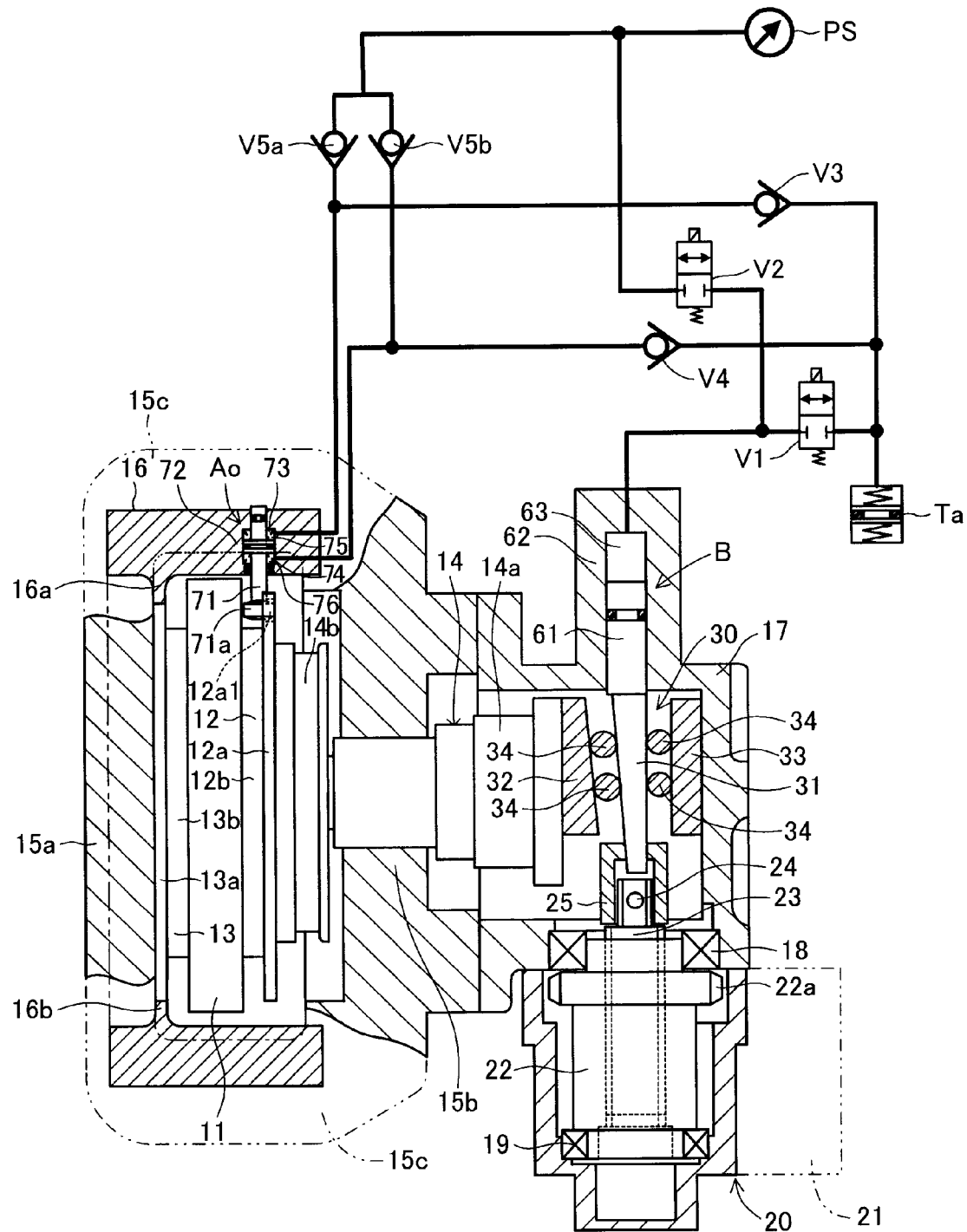
FIG. 4 is a view schematically showing a modification of the second embodiment of the disc brake apparatus according to the present invention.

The second embodiment employs the changeover valve V5 which functions as follows: in the case where a positive pressure is built up in the oil chamber 75, while a negative pressure is built up in the oil chamber 76, the changeover valve V5 establishes communication between the oil chamber 75 and the pressure-increasing solenoid valve V2 and shuts off communication between the oil chamber 76 and the pressure-increasing solenoid valve V2; and in the case where a negative pressure is built up in the oil chamber 75, while a positive pressure is built up in the oil chamber 76, the changeover valve V5 shuts off communication between the oil chamber 75 and the pressure-increasing solenoid valve V2 and establishes communication between the oil chamber 76 and the pressure-increasing solenoid valve V2. However, as shown in FIG. 4, in place of the changeover valve V5, a pair of check valves V5a and V5b may be employed.

The above-described embodiments employ the motor-driven actuator 20 as an actuator which operates in accordance with the operation force. However, as shown in FIG. 5, which shows a third embodiment of the present invention, the present invention can be embodied by employing a hydraulic actuator 120 as an actuator which operates in accordance with the operation force, and a stepped braking piston 114 which is pushed by means of the hydraulic actuator 120 and a servo cylinder 162, which serves as a servomechanism.

Figure 5:
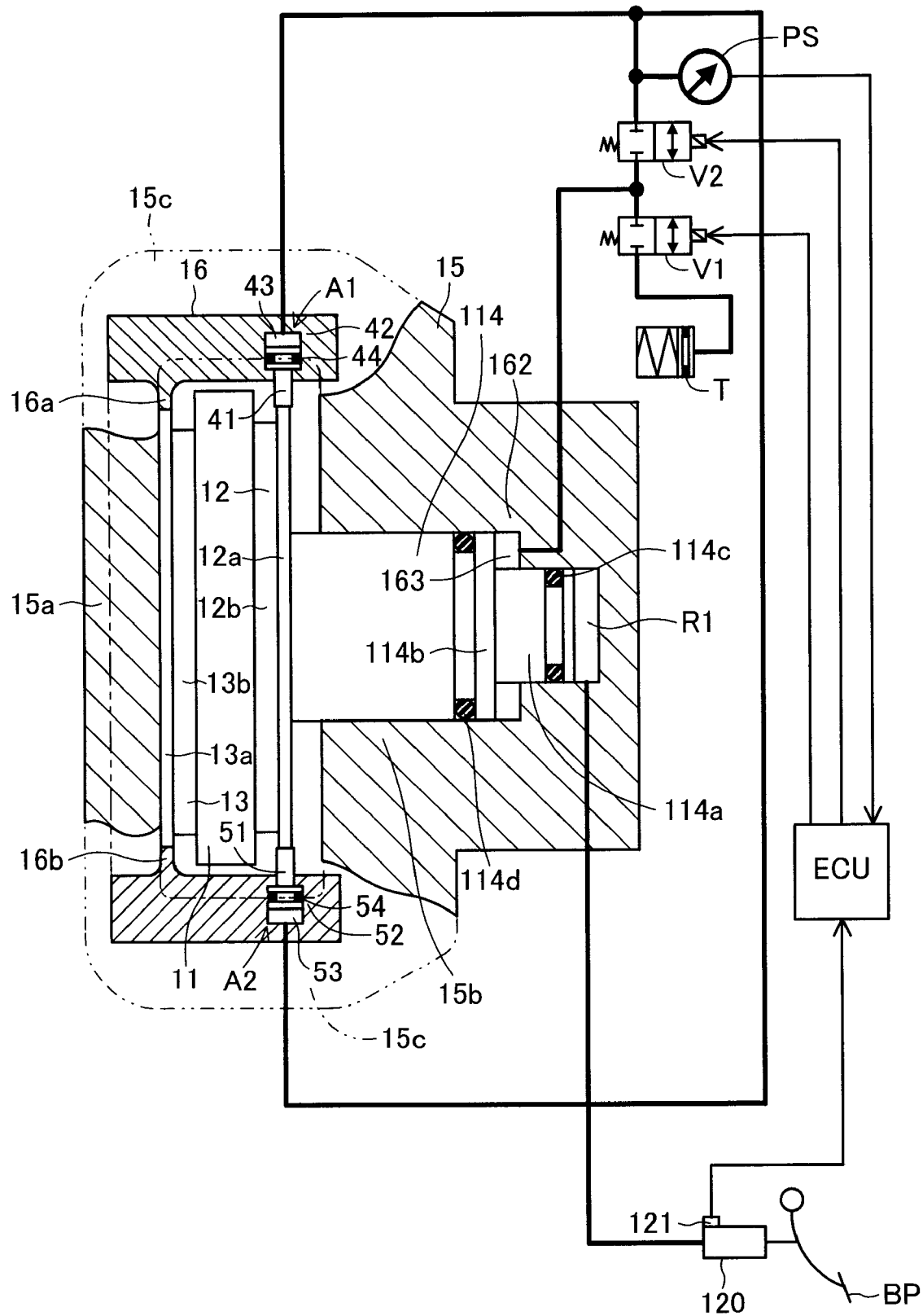
FIG. 5 is a view schematically showing a third embodiment of a disc brake apparatus according to the present invention.

The hydraulic actuator 120 of the third embodiment shown in FIG. 5 is a brake master cylinder which operates in response to the driver stepping on the brake pedal BP. An oil pressure which is built up in the hydraulic actuator 120 (an oil pressure which depends on the operation force) can be detected by a sensor 121 and can be supplied to an oil chamber R1 where a small-diameter portion 114a of the braking piston 114 is exposed. The servo cylinder 162 is provided integrally with the caliper 15. The servo cylinder 162 and a large-diameter portion 114b of the braking piston 114 define an oil chamber 163. Seal members 114c and 114d are attached to the small-diameter portion 114a and the large-diameter portion 114b, respectively, of the braking piston 114.

In the third embodiment, the sensor 121 corresponds to the sensor 91 of the first embodiment, and the oil chamber 163 corresponds to the oil chamber 63 of the first embodiment. Since other configurational features are substantially similar to those of the first embodiment, like components are denoted by like reference numerals, and repeated description thereof is omitted. Also, since the third embodiment operates substantially similarly to the first embodiment, description of the operation of the third embodiment is omitted.

The above embodiments employ two oil pressure control valves for reducing and increasing the anchor oil pressure; i.e., the pressure-reducing solenoid valve V1 and the pressure-increasing solenoid valve V2. However, the present invention can be embodied such that these two oil pressure control valves is replaced with a single oil pressure control valve. In the above-described embodiments, the present invention is applied to a movable-caliper-type disc brake apparatus. However, the present invention can be applied to disc brake apparatuses of other types in a manner similar to the above-described embodiments with or without appropriate modifications.

What is claimed is:

1. A disc brake apparatus comprising:
    an actuator operating in accordance with an operation force of a brake pedal; wherein the actuator is a motor driven actuator;
    a braking piston fitted into a cylinder portion of a caliper to be axially slidable, the braking piston being axially driven by the actuator so as to push a pad toward a disc rotor;
    an anchor mechanism for taking out, as an anchor oil pressure, a friction force in a circumferential direction of the disc rotor between the pad and the disc rotor;
    a servomechanism for converting the anchor oil pressure to a servo oil pressure, which is applied to the braking piston;
    changing means provided in the servomechanism and adapted to increase or decrease the servo oil pressure, the changing means comprising a first solenoid valve which establishes or shuts off communication between the anchor mechanism and the servomechanism, and a second solenoid valve which establishes or shuts off communication between the servomechanism and a reservoir tank;
    a sensor for detecting the anchor oil pressure; and
    control means for controlling the first and second solenoid valves electrically in accordance with the operation force and the anchor oil pressure to increase the servo oil pressure for bringing the anchor oil pressure toward a set value determined by the operation force when the detected anchor oil pressure is lower than the set value and to decrease the servo oil pressure for bringing the anchor oil pressure toward the set value when the detected anchor oil pressure is higher than the set value.

2. A disc brake apparatus according to claim 1, further comprising:
    a transmission mechanism configured to convert movement of a wedge member into movement of the braking piston in the axial direction,
    wherein the wedge member is driven by the actuator and the servo oil pressure to push the pad toward the disc rotor.

3. A disc brake apparatus according to claim 1, wherein the sensor is disposed in an oil circuit between the anchor mechanism and the changing means.

* * * * *